US007221987B2

(12) United States Patent
Bett et al.

(10) Patent No.: US 7,221,987 B2
(45) Date of Patent: May 22, 2007

(54) GENERATING A RELIABILITY ANALYSIS BY IDENTIFYING CASUAL RELATIONSHIPS BETWEEN EVENTS IN AN EVENT-BASED MANUFACTURING SYSTEM

(75) Inventors: Thomas Arthur Bett, Oshkosh, WI (US); Tanakon Ungpiyakul, Neenah, WI (US); Walter Caswell Reade, Appleton, WI (US); Michelle Reneé Irwin, Neenah, WI (US); Jeremy Brian Cannady, North Augusta, SC (US); Babe Bedenbaugh, Leesville, SC (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 302 days.

(21) Appl. No.: 10/868,137

(22) Filed: Jun. 15, 2004

(65) Prior Publication Data
US 2005/0278052 A1 Dec. 15, 2005

(51) Int. Cl.
*G06F 19/00* (2006.01)
(52) U.S. Cl. ............... 700/108; 700/109; 700/110; 700/122; 700/174
(58) Field of Classification Search ........... 700/51, 700/122, 108–110, 127–129, 174
See application file for complete search history.

(56) References Cited

U.S. PATENT DOCUMENTS

| 5,291,416 A | * | 3/1994 | Hutchins | ............. 700/174 |
| 6,073,055 A | | 6/2000 | Jahn et al. | |
| 6,260,188 B1 | | 7/2001 | Ungpiyakul et al. | |
| 6,467,052 B1 | | 10/2002 | Kaler et al. | |
| 6,522,939 B1 | | 2/2003 | Strauch et al. | |
| 6,542,830 B1 | * | 4/2003 | Nakazato et al. | ............. 702/35 |
| 6,671,570 B2 | | 12/2003 | Schulze | |
| 6,868,310 B2 | * | 3/2005 | Nasman et al. | ............. 700/291 |
| 6,947,797 B2 | | 9/2005 | Dean et al. | |
| 7,079,984 B2 | * | 7/2006 | Eryurek et al. | ............. 702/185 |
| 2003/0033042 A1 | | 2/2003 | Haller et al. | |
| 2003/0150908 A1 | | 8/2003 | Pokorny et al. | |
| 2003/0150909 A1 | | 8/2003 | Markham et al. | |
| 2003/0154144 A1 | | 8/2003 | Pokorny et al. | |
| 2003/0155415 A1 | | 8/2003 | Markham et al. | |
| 2003/0158795 A1 | | 8/2003 | Markham et al. | |

FOREIGN PATENT DOCUMENTS

| WO | WO 03/058506 A1 | 7/2003 |
| WO | WO 03/058532 A1 | 7/2003 |

OTHER PUBLICATIONS

Hannibal, "Opt-out Feature for RFID Tags", available at http://arstechnica.com/news/posts/1052194426.html. May 5, 2003, 2 pages, Ars Technica, LLC, USA.

* cited by examiner

*Primary Examiner*—Alexander Kosowski
(74) *Attorney, Agent, or Firm*—Senniger Powers

(57) ABSTRACT

Analyzing an event chronology record to permit identification of periods of a production sequence that correspond to a high probability of failure. Systems and methods include receiving an event chronology for a particular machine in the production sequence and for a particular time interval. A reliability analysis system accesses process flow information to determine whether a particular event in the event chronology is related to a subsequent adverse event within a predefined event window.

33 Claims, 5 Drawing Sheets

GENERATING A RELIABILITY ANALYSIS BY IDENTIFYING CASUAL RELATIONSHIPS BETWEEN EVENTS IN AN EVENT-BASED MANUFACTURING SYSTEM

FIELD OF THE INVENTION

Embodiments of the invention generally relate to analysis of process reliability in manufacturing systems. In particular, embodiments of the invention relate to a system and method for constructing and analyzing a detailed event chronology in event-based manufacturing systems to identify causal relations between events that affect reliability.

BACKGROUND OF THE INVENTION

Cost savings programs for manufacturing systems are continuously striving to minimize waste and improve the quality of product given to the consumer. For example, a statistical control model such as disclosed in commonly owned U.S. Pat. No. 6,260,188 enables the setup and control of a process to optimize process and product quality and efficiency. Existing manufacturing systems have evolved over time such that most easy-to-find, intuitive, or obvious opportunities to minimize waste and improve productivity have long been fixed or are effectively managed. Efforts to improve productivity often require fundamental changes in equipment capability and/or reliability to remove technical liabilities that are experienced during production operation.

A previous analysis tool presents cull waste results from a machine chronology built from data obtained during the manufacturing process. However, this tool analyzes and presents results on a univariate basis or pools results across time to the shift level of resolution (e.g., 12-hour blocks). Pooling and tabulating production data results in a loss of event/time order and fails to define interrelations describing cause and effect (e.g., identifying driving events). In addition, the speed, complexity, and size of modern manufacturing systems make it difficult to determine causal relationships without knowledge of the process flow.

Accordingly, there is a need for systems and methods that provide a fast, convenient, standardized means of obtaining detailed process reliability information for a particular asset and period of operation.

SUMMARY OF THE INVENTION

In order to solve these and other needs in the art, the inventors hereof have succeeded at designing systems and methods for identifying events or time periods in a production sequence that correspond to a high probability of failure. Embodiments of the present invention define machine section performance to identify improvement opportunities comprehended from the basis of a detailed production chronology. In one example, a reliability analysis system (RAS) retrieves information from a database populated with data from an event-based manufacturing process. The retrieved data is used to create a process chronology that facilitates the evaluation of process reliability in detail. In general, the invention tests for correlations over a large event space to identify those events within a specified event window that may be responsible for adverse events by consulting process flow information. Combining delay, waste, and material usage tables into a process chronology permits examination of both spatial and temporal aspects of efficiency. Evaluation of process reliability includes understanding the performance of the entire converting machine or any section (e.g., unit or component operation) within the machine.

Further, an analysis tool according to an embodiment of the invention allows a user to allocate stop events to high-risk periods of operation such as raw material splice and start-up events. This permits improvement efforts to define and focus on discrete periods of production operation, where improvement will provide the maximum gain for the overall production.

In one form, a method analyzes reliability of a manufacturing system. The method includes receiving an event chronology having a plurality of chronologically ordered event records. Each of the plurality of chronologically ordered event records has a machine section value associated therewith. The method also includes identifying an adverse event record in the received event chronology. The method includes determining a relationship between the adverse event record and a previous event record in the event chronology by comparing the machine section value of the identified adverse event record and the machine section value of the previous event record. The method further includes incrementing a value representative of a correlation between the identified adverse event record and the previous event record as a function of the determined relationship.

In another form, one or more computer-readable media have computer-executable components for analyzing reliability of a manufacturing process. The components include an interface component for receiving an event chronology having a plurality of chronologically ordered event records. Each of the plurality of chronologically ordered event records has a machine section value associated therewith. The components also include a process flow component for identifying a causal relationship between the event records in the event chronology received by the interface component by identifying an adverse event record in the event chronology and determining if the machine section value of the identified adverse event record and the machine section value of a previous event record in the event chronology are related. The components also include a display component that displays the identified causal relationship to a user.

In yet another form, a system analyzes the reliability of a manufacturing process that has one or more machine sections. The system includes an event chronology that has a plurality of chronologically ordered event records. Each of the plurality of chronologically ordered event records has a machine section value associated therewith. The system also includes a memory area for storing process flow information identifying at least one relationship between machine section values. The system also includes a processor configured to execute computer-executable instructions for identifying a causal relationship between at least two of the event records in the event chronology by accessing the process flow information stored in the memory area.

In still another form, in a computer system that has a user interface including a display and a user interface selection device, a method enables a reliability analysis of a production sequence. The method includes displaying the user interface to a user on the display. The user interface defines a time interval form and a target location form. The method also includes receiving from the user via the user interface selection device a time interval value from the time interval form. The method also includes receiving from the user via the user interface selection device a target location value from the target location form. The method also includes receiving an extraction command from the user via the user interface selection device. The method also includes extracting, in response to the received extraction command, delay data and raw material usage data from one or more data tables as a function of the received time interval value and the received target location value. The method also includes merging the extracted delay data and raw material usage data into an event chronology. The event chronology includes a plurality of chronologically ordered event records. Each of the plurality of chronologically ordered event records has a machine section associated therewith. The method also includes identifying an adverse event record in the event chronology. If the machine section of the identified adverse event record and the machine section of a previous event record in the event chronology are related, the method increments a value on the display. The value represents a correlation between the identified adverse event record and the previous event record.

In another form, a user interface enables a reliability analysis of a production sequence. The user interface has a display and provides a report and a data set used to generate the report. The user interface includes a start-up reliability portion for displaying on the display a tabulation of start-up failure events for a target machine during a time interval. The user interface includes an efficiency portion for displaying on the display splice efficiency data for the target machine during the time interval.

In yet another form, a user interface enables a reliability analysis of a production sequence. The user interface has a display and provides a report and a data set used to generate the report. The user interface includes a first field for displaying classification information on the display. The classification information specifies a target machine and a time interval. The user interface also includes a second field for displaying on the display a data set summary for the target machine during the time interval. The user interface also includes a third field for displaying on the display a plurality of delay events for the target machine during the time interval categorized by process location. The user interface also includes a fourth field for displaying on the display a tabulation of start-up failure events for the target machine during the time interval. The user interface also includes a fifth field for displaying on the display splice efficiency data for the target machine during the time interval.

In still another form, a computer-readable medium stores a data structure that represents process flow information in an event-based manufacturing process. The data structure includes a first field storing a value identifying a machine section. The data structure also includes a second field storing a plurality of values representing a list of machine sections related in the manufacturing process to the machine section identified in the first field.

In another form, a system enables a reliability analysis for a production sequence. The system includes a chronology tool for building an event chronology from data collected from an event-based manufacturing system. The event chronology includes a chronologically ordered sequence of event records pertaining to delay data and material usage data. The system also includes a reliability analysis tool for producing a report from the event chronology built by the chronology tool. The report includes the event chronology. The report further includes a plurality of dimensions. The dimensions include a measure of reliability during machine start, a measure of reliability of a running operation, and a measure of reliability per asset in the production sequence and per time frame.

Alternatively, the invention may comprise various other methods and apparatuses.

Other features will be in part apparent and in part pointed out hereinafter.

BRIEF DESCRIPTION OF THE DRAWINGS AND TABLES

Figure 1:
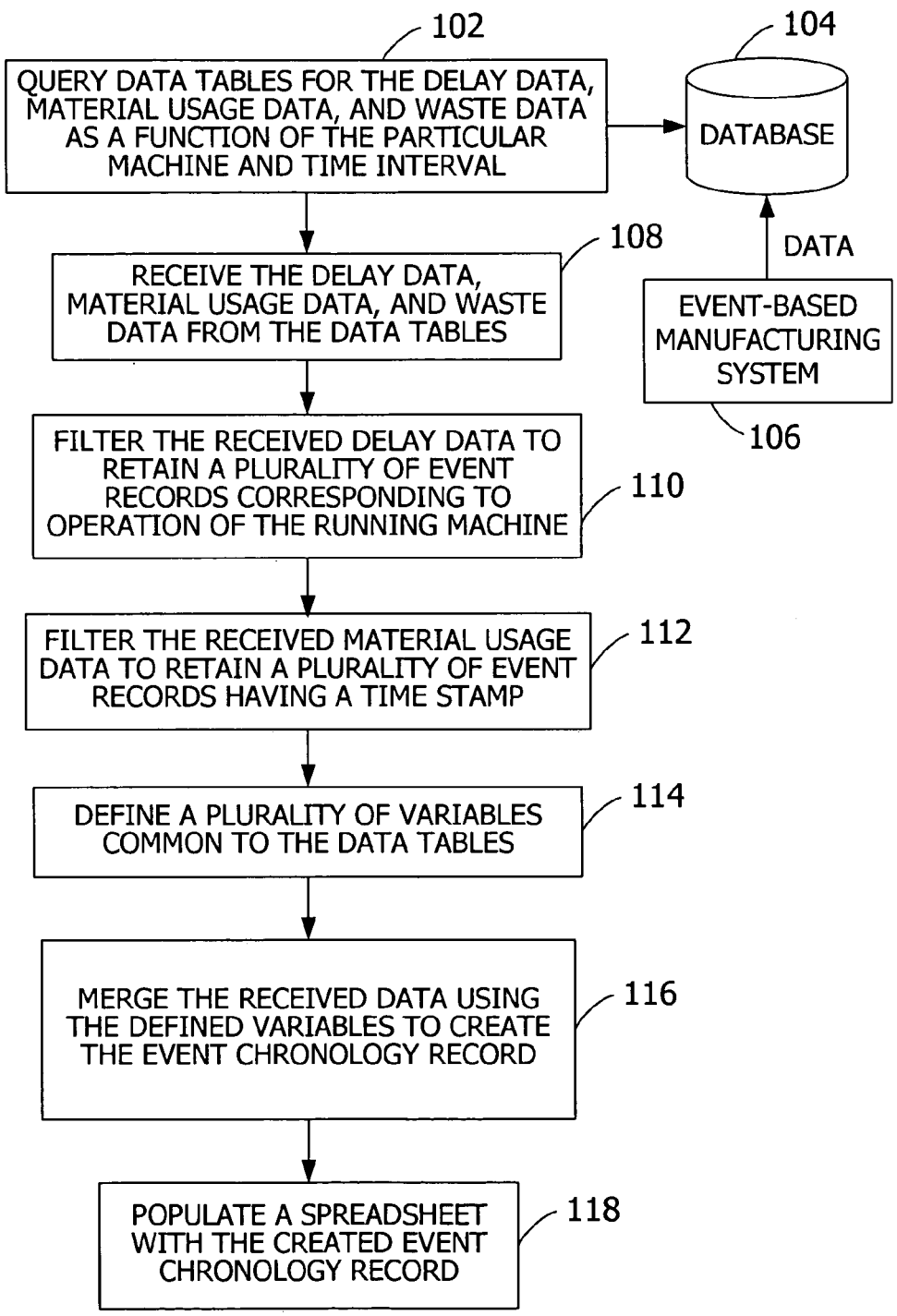
FIG. 1 is an exemplary flow chart illustrating the construction of an event chronology data set.

TABLE 1 illustrates various levels of process information availability.

TABLE 2 illustrates exemplary variables common to material usage, delay and waste tables.

TABLE 3 illustrates a merged dataset for event chronology indicating a leg elastic start-up failure.

TABLE 4 illustrates an example of a post-splice failure event for a containment flap system.

TABLE 5 illustrates an example of a pre-splice failure event for a containment flap system.

TABLE 6 illustrates the results of a delay and material extraction.

TABLE 7 illustrates the results of a delay and waste extraction.

TABLE 8A illustrates the results of a subsection report conducted for the ear machine section.

TABLE 8B illustrates the results of a SATO subsection report conducted for the ear machine section.

TABLE 9 illustrates a column explanation for an exemplary RAS report.

TABLES A1–A4 illustrate an exemplary RAS report.

Corresponding reference characters indicate corresponding parts throughout the drawings.

DETAILED DESCRIPTION OF THE INVENTION

Personal care absorbent articles such as disposable diapers, training pants, other infant care products, other child care products, feminine napkins, panty liners, interlabial pads, other feminine care products, incontinence articles, and other adult care products are typically manufactured using high-speed processing machines which convert a stabilized web or ribbon of a fibrous absorbent material into an article. Each web is pre-formed and provided to the machine as a wound roll or coil. To prevent interruption of the processing machine a trailing end of each coil is spliced to a leading end of the next coil. The resulting interconnected web has sufficient tensile strength so that it may be provided to the machine and processed without breaking at the splice.

However, breaks at splices and other adverse events do occur during the manufacturing process. The invention includes a system for analyzing the reliability of the machine and the process by studying and relating event records in a chronologically ordered sequence of event records representing an event chronology. Generally, an event record is a collection, in any form, of data identifying, defining, or otherwise describing an event.

Existing reliability analysis systems support needs at a relatively high level (e.g., Levels I and II in Table 1 below). Most of the existing web-based systems summarize data only by process location. With these existing systems, the data lose time-order and other "relational structure" or sequential aspects of potential interest by being summarized over the span of production under investigation. This results in the loss of ability to define or correlate waste or delay events with specific periods of converting that contain the root causes of the technical issues. While time-order resolution is typically not needed for analyses based on data sets taken across several machines, such detail is useful when interpreting the specific failure modes and sequences occurring within a given converting line.

TABLE 1

Process Information Availability.

| Level | Application | User Group |
|---|---|---|
| I | Sector (Overall Trends) | Business Management |
| II | Among Plants and Assets | Operations Management |
| III | Within Assets/Among Unit Operations | Operations Support and Technical Development |
| IV | Within Unit Operations | Operations Support and Technical Development |

In one embodiment, the invention includes enabling an analysis of reliability per asset and per time interval in a manufacturing system. In particular, the invention includes building an event chronology from production data to identify time periods in a production sequence that correspond to a high probability of machine failure. Opportunities for improving reliability may be identified and comprehended by mining production data across a considerable span of production history. Volumes of process data are converted into useful information (e.g., at Levels III and IV in Table 1), and the information is further judged to produce technical insights. In one example, the invention provides a means for measuring diaper machine reliability based upon an allocation of stop occurrences to specific operational locations and sequences within the unit operations of the system. In another embodiment, stop events are allocated to specific operational sequences within a unit operation. The contrasting basis for categorization is built from detailed information about the materials (e.g., webs) used in converting at that point in time.

Developing relational assessments through production history (e.g., time) includes comparing certain quantitative criteria in a current data record to temporally subsequent data records within a specified time interval. For example, a reliability analysis for a machine or machine section may be based upon relations existing between variables representing spatial and temporal aspects of reliability. Spatial aspects of reliability include, for example, unit operations or locations in the converting system incurring waste or delay events and material consumption events. A temporal aspect of reliability includes, for example, the computed quantity of cuts (products) run between such data records. Formulae facilitate the comparisons by operating on a cleansed (e.g., filtered) table having merged delay and material usage data.

The means for measuring reliability includes any software or hardware methods for producing analyses and tabular presentations of data. For example, "MICROSOFT" brand software such as Access or programming languages such as FORTRAN constitute the means for measuring reliability, and more specifically, constitute a means for displaying an event chronology or event chronology record and a reliability analysis to a user. In another embodiment, the means for measuring reliability or displaying the event chronology includes the "MICROSOFT" brand software such as Excel or other spreadsheet application programs. The spreadsheet program incorporates one or more macros to develop the relational aspects of the stored process data. The means for measuring reliability and the means for displaying the event chronology and event chronology record, however, are not limited to a spreadsheet. For example, the means for measuring reliability also includes a database program, a visual programming environment, or any other platform that provides a user interface and an analysis engine.

Event Data

In one embodiment, systems and methods of the invention build an event chronology from data obtained by an intelligent, event-based manufacturing system for tracking production information from one or more manufacturing facilities. For example, the invention is operable with systems including the PIPE/STORM systems disclosed in commonly owned U.S. patent application Ser. No. 10/306,794, "Communication Between Machines and Feed-Forward Control in Event-Based Product Manufacturing," filed Nov. 27, 2002 by Markham et al., U.S. patent application Ser. No. 10/306,868, "Quality Management and Intelligent Manufacturing with Labels and Smart Tags in Event-Based Product Manufacturing," filed Nov. 27, 2002 by Markham et al., and U.S. patent application serial number, "User Interface for Reporting Event-Based Production Information in Product Manufacturing," filed Nov. 27, 2002 by Pokorny et al., all of which are herein incorporated by reference. PIPE collects, stores, and reports production information such as converting machine productivity, waste, and delay information on an event basis. In this system, machine data from sensors and other control means are continually monitored for events related to productivity and/or product quality, such as product waste, machine down time, machine slow downs, production line maintenance, product maintenance, machine failure, etc.

An "event," as used herein, refers to any discrete occurrence during the manufacturing process. For example, an event includes an incident that may affect the productivity of a process or machine in use to produce a product, or that may adversely affect the quality of the product being produced. However, an event is not necessarily adverse. Generally, adverse events are adverse relative to the other events in the event chronology (e.g., from a productivity or quality perspective). Adverse events include any events negatively affect any aspect of the manufacturing process. For example, events that adversely affect the productivity of a process or machine by increasing delay are "adverse productivity events." Productivity events that lead to waste are "waste events," while those that cause delay are "delay events." Events that adversely affect the quality of a product are "adverse quality events." As used herein, "intermediate events" may refer to incidents during a first process for the production of an intermediate product to be used as a raw material (starting material) in a second process for the production of a finished product (or another intermediate product or product component), wherein the incident in the first process may affect the productivity of the second process or adversely affect the quality of the product of the second process. Thus, an intermediate event in a first process may lead to an adverse productivity event or an adverse quality event in a second process. An adverse quality event may also refer to incidents that may adversely affect the quality of an intermediate product, such that the risk of rejection of the product by a subsequent user (including an industrial user) is increased. The PIPE system may be used to track any or all types of events, including events from multiple machines and processes wherein intermediate products from early processes or machines are used as raw materials in later processes or machines, and optionally wherein the event data for the intermediate products are used by operators or process control equipment to properly execute the subsequent processes based on the events associated with the intermediate product or, in general, with the quality and property attributes of the intermediate product as recorded at least in part with a system such as PIPE.

Examples of adverse and non-adverse events include, but are not limited to, a web break, a component failure in a machine, a loss of manpower (e.g., inadequate employees present during a shift), a loss of power, a fire, machine shutdown to change a grade ("changeover") or perform routine maintenance, unacceptable quality in raw materials, market curtailment (e.g., inadequate orders or excess inventory), an experimental run, a startup, the splicing in of a raw material, the culling of an individual article, web shifting past a critical point, and the like.

As used herein, "production information" includes waste data, delay data, machine speed data, product code, and any other data related to production. In some systems, production information is segregated from waste and delay data, even though waste and delay data are considered production information. In general, the invention is operable with any form of waste data, delay data, or other production information or event data. For example, production information includes raw material usage information. Raw material usage information includes, but is not limited to, a raw material lot number, an amount of material in the roll, a time the roll was spliced on or off, a number of products produced from the roll of material, a supplier of the material, a specific location or lane of production for the material roll from within the lot and batch produced on the parent machine (e.g., deckle position), and the date the material was produced.

In general, waste and delay information, as well as other productivity parameters, may be automatically captured for a raw material during a process on an event basis and stored in a database or other memory area for further processing. The captured information describing events includes electronic data in time series form about production defects may be available that may be of value for a process control system and for evaluation by an operator or administrator. For example, data in the PIPE database is used to evaluate process reliability in considerable detail whether the task is to understand the performance of the entire converting machine, or any section (e.g., unit or component operation) within the machine. Combining the PIPE delay and material usage tables into an event or process chronology permits examination of both spatial and temporal aspects of reliability.

For example, an exemplary event chronology tool of the invention represents a convenient means of obtaining a clean (e.g., filtered), chronologically ordered data set for further statistical analysis. Multiple data extraction/combining options are available in the tool based on the event chronology data set. The tool summarizes and reports structured information (e.g., chronologically ordered) from the event chronology data set (e.g., reports) and includes the data set in the report. This is an advantage over other "enterprise information systems" which provide various reports of extracted results but do not provide the data sets for examination of curious values or other statistical properties which often are of interest to the investigator. The event chronology tool of the invention enables the user to conduct further exploration and/or analysis of the individual data values that were used to produce the report.

Constructing a Machine Chronology from Event Data

Construction of a machine chronology from event data sets such as delay and material usage data to represent causal events that affect converting reliability involves several considerations. Merging data sets from a large scale, multipurpose system with numerous tables, numerous variables within each table, and differing table nomenclature is difficult. Corrective formulae and/or data filters included in the automated tools of the invention aid in preventing erroneous values from contaminating and invalidating quantitative analytical results. The formulae and filters described herein are merely exemplary. Other formulae and filters that reduce the introduction or propagation of errors are within the scope of the invention.

Delay record times are typically incremental and do not reflect whether the machine is running or stopped. Irrelevant delay data may result from capturing delay time charges when the process is stopped as well as delay occurrences that stop the process when it is running. As such, in one embodiment, constructing a machine chronology includes filtering the delay data to retain only running failures. This means eliminating the event records that are time charges and are not related to process reliability faults. Only the event records that occurred during machine run and are related to process reliability are included (e.g., not time charges while the machine was down). A run duration (e.g., the difference between legitimate delay records based on cut count) is computed from cut count for each reliability event.

Constructing the machine chronology further includes filtering the material usage data to retain only time-stamped records. Material consumption events logged to shift without time and cut-stamp information are generally not useful for the examination of process events.

In one embodiment, commercially available software tools associated with database application programs may filter the delay data and the material usage data. However, any computer-executable instructions or other software that performs the filtering is within the scope of the invention.

Constructing the machine chronology further includes computing the event duration based on the difference in cut count between relevant data records to provide the fundamental basis for evaluating event windows and constructing causal relations.

Building an event chronology from data tables includes the definition of variables to permit data from different tables to be correctly merged or re-constituted into another larger, more comprehensive table. To accomplish this, variables in the targeted tables are scrutinized for commonality. Some variables have the same name. Other variables have the same key characteristic, but do not have the same name. Exemplary variables for tables storing material usage, delay, and waste data are shown below in Table 2.

TABLE 2

Exemplary Variables Common to Material Usage, Delay and Waste Tables.

| Material Usage | Delay | Waste |
|---|---|---|
| machine_reference | delay_code | waste_code |
| cons_loc_code | delay_event_dt | waste_event_dt |

TABLE 2-continued

Exemplary Variables Common to Material Usage, Delay and Waste Tables.

| Material Usage | Delay | Waste |
| --- | --- | --- |
| splice_on_dt | machine_reference | machine_reference |
| splice_off_dt | gs_event_dt | gs_event_dt |
| load_dt | delay_total | defect_occur |
| cuts_on | machine_section | current_cut_count |
| cuts_off | delay_problem | waste_occur_count |
| overrode | delay_action | source |
| item_number | comment | modify_date |
| lot_number | delay_subsection | machine_state |
| quantity | process_change | |
| fps_value | part_change | |
| supplier | user_id | |
| material_type_code | current_cut_count | |
| cons_status | delay_updated | |
| matl_op_comment | reason_code | |
| gs_event_dt | delay_indicator | |
| measured_quantity | modify_date | |
| dia_off | machine_state | |
| source | spa_code | |
| modify_date | section_code | |
| module_cuts | delay_occurrence | |
| product_code | | |
| Cuts | | |
| held_matl | | |

The filtered data are merged into a single "process event chronology" based on time stamps (gs_event_dt, delay_event_dt, splice_on_dt, waste_event_dt) and cut count (current_cut_count, cuts_on). A process event duration is computed by differencing the records in the chronology table. This permits evaluation of process events within "windows" specified at the cut-count level of resolution. Computation of the event duration also enables quantitative statistical analysis of various capability or reliability events on the unbiased basis of cuts run. Efforts which analyze such relations based on differences in time stamps are subject to serious bias based on differences in machine speeds and the like.

The completed, cleansed (e.g., filtered) machine chronology table is further analyzed for the specified relations and results are fed to a report page as provided by the various tools. A particular embodiment for building the event chronology is next described.

Referring first to FIG. 1, an exemplary flow chart illustrates the construction of an event chronology data set. The method includes querying one or more data tables at 102 for the delay data, material usage data, and waste data as a function of the particular machine and time interval. For example, software of the invention accesses a database 104 storing data obtained by an event-based manufacturing system 106 (e.g., manufacturing an absorbent article). The method receives the delay data, material usage data, and the waste data as a plurality of event records at 108 (e.g., via an interface component). The method further includes filtering (e.g., via a filter component) the received delay data at 110 to retain a plurality of event records corresponding to operation of the running machine. The method further includes filtering the received material usage data at 112 to retain a plurality of event records each having a time stamp. The method further includes merging the received waste data, the filtered delay data, and the filtered material usage data at 116 (e.g., via a database component) to create the event chronology record. For example, merging occurs based on a time stamp and/or cut count associated with each event record. As the data tables may store related data under different variable names, the method includes defining a plurality of variables common to the data tables at 114 to facilitate merging the data. The method further includes computing an event duration as a difference in the cut count between temporally consecutive event records to define performance of the machine. The created event chronology record is used to populate a spreadsheet or other implementation platform at 118 or otherwise generate an information data set for a reliability analysis (e.g., via a spreadsheet component or other means for displaying the event chronology record to a user). In one embodiment, one or more computer-readable media have computer-executable instructions for performing the method illustrated in FIG. 1.

An analysis of machine productivity concerned with production sequence and probable "driving events" evaluates periods of transient upset. Some of these transients are well known and are primarily related to the machine stop/start cycle, and material consumption events (splicing). Although machine stops and starts and raw material splices are known to be drivers of adverse events, an embodiment of the invention test for correlations of any transient event that is recorded in the process database record. Relevant periods of operation are defined to permit the data records to be classified as either within or not within the transient period of operation. Such "event windows" are determined based on differences in cut count between data records. The actual computation of run duration and event duration (e.g., differences among cut counts in chronologically ordered data records) is performed with an awareness of the technology upon which the data are based.

Additionally, cut count is taken from a per-product incrementing counter that contains the finite range of values from 1 to 10,000,000. When the upper limit of 10,000,000 is reached the counter "rolls over" to 1. Consequently, to provide accurate run and event durations in view of the opportunity for cut count rollovers, a roll over correction is applied in the differencing formula. To ensure some combination of time stamp error and cut count roll over changes never result in the generation of "ridiculous data values", an absolute filter is applied to restrict records to only those cases where run duration and event duration are below a realistic specified upper limit. For example, this value may be specified to be 400,000 cuts.

For the machine stop/start cycle, the standard event window for ramp-up is defined as existing from 1 through 1500 cuts after run enable. The computation of run duration from delay and other event records in the chronological dataset makes detailed description and analysis of the individual values possible. In one example, the standard window for machine start-up is 1500 cuts. The event window length of 1500 cuts is an exemplary event duration. In one embodiment, software of the invention allows the window length to be changed to a user-defined value for exploratory analyses. In general, the window length value ranges from 0 to 3000 cuts to evaluate various scenarios affecting process reliability. Table 3 below presents an example of a start-up failure (see row 6, Column 2=leg elastic, Column 6=Run Duration). Note the run duration and event duration for this record are equal and the value is less than 1500 cuts. In Table 3 below, a diaper sausage refers to an assembly of materials, typically still continuous webs (e.g., comprising most of the elements required for a finished product) at an intermediate point in the converting operation prior to being cut into discrete products. The term "sausage" is used because the web composites typically hold absorbent materials and other "stuffing" between the outer most (cover) and inner most (body side liner) layers of webs.

TABLE 3

A merged dataset showing a leg elastic start-up failure.

| Sub-Section | Machine Section | Cons_Loc_Code | Date | Cut Count | Run Duration | Event Duration |
|---|---|---|---|---|---|---|
| cut & place | Waist elastic | | 1/2/2003 15:36 | 2064960 | 5171 | 543 |
| | | 1 | 1/2/2003 15:45 | 2068822 | | 3862 |
| | | 68 | 1/2/2003 15:45 | 2068982 | | 160 |
| | | 63 | 1/2/2003 15:48 | 2070826 | | 1844 |
| waist elastic cut & place (wrap-up only) | diaper sausage | | 1/2/2003 15:50 | 2072108 | 7148 | 1282 |
| applicator | leg elastic | | 1/2/2003 15:57 | 2072250 | 142 | 142 |
| | | 65 | 1/2/2003 16:03 | 2074629 | | 2379 |
| elastic applicator roll | containment flap | | 1/2/2003 16:22 | 2087025 | 14775 | 12396 |
| | | 69 | 1/2/2003 16:22 | 2087025 | | 0 |

In one embodiment, if a failure occurs during start-up, it is counted as such even if a splice is active within the event window (e.g., joint events are not counted in one embodiment).

At least two types of failure events are contemplated to capture the converting liabilities associated with the material consumption transient: post-splice failures and pre-splice failures. Both are easily identified structural relations within the event chronology.

In an exemplary event chronology, the material consumption record precedes the delay record, the associated event duration is greater than zero (e.g., indicating the splice was not made with the machine stopped), the next record has a run duration greater than 1500 (e.g., indicating the stop did not occur during a start-up event window), and the event duration for the stop is less than 1500 cuts (e.g., indicating the splice occurred within the specified range.

An example of a post-splice failure event is provided as Table 4. Note the consumption event occurring in row 2 is code 69 (Containment Flap Unwind—B Spindle), the next record occurring in row 3 is a delay event charged to containment flap, the run duration (since the prior stop) is 4893 cuts and the event duration (cuts run since the splice record) is 34 cuts.

TABLE 4

Example of Post-Splice Failure Event for the Containment Flap System.

| Sub-Section | Machine Section | Cons_Loc_Code | Date | Cut Count | Run Duration | Event Duration |
|---|---|---|---|---|---|---|
| | | 65 | 1/2/2003 21:09 | 2230137 | | 3062 |
| | | 69 | 1/2/2003 21:12 | 2231934 | | 1797 |
| elastic applicator roll | containment flap | | 1/2/2003 21:12 | 2231968 | 4893 | 34 |
| unwind | tcf elastic | | 1/2/2003 21:24 | 2238345 | 6377 | 6377 |

Festoon fill refers to the process of providing web length in a material storage device (e.g., a festoon) that permits supply to a running converting line during a zero speed splicing event. The festoon is filled (e.g., expanded) then collapses to supply material to the running converting operation during the process of decelerating the expiring roll to stop, executing the splice (e.g., attachment of expiring to replenishing roll) at zero speed, then accelerating the replenishing roll to full run speed. A pre-splice failure event situation occurs when web issues during festoon fill fail the process before the consumption event occurs. Therefore, the delay record precedes the consumption record, and the event duration between delay and consumption equals zero cuts. An example of this is shown in Table 5 below. Note row 2 shows a delay event for Containment Flap and row 3 shows a material consumption event for Containment Flap on the B-Spindle. The event duration is zero cuts between the delay and matching consumption event, indicating a pre-splice failure situation.

TABLE 5

Example of a Pre-Splice Failure Event for Containment Flap.

| Sub-Section | Machine Section | Cons_Loc_Code | Date | Cut Count | Run Duration | Event Duration |
|---|---|---|---|---|---|---|
| | | 65 | 1/2/2003 16:03 | 2074629 | | 2379 |
| elastic applicator roll | containment flap | | 1/2/2003 16:22 | 2087025 | 14775 | 12396 |
| | | 69 | 1/2/2003 16:22 | 2087025 | | 0 |
| idler under adhesive head | waist elastic | | 1/2/2003 16:28 | 2087620 | 595 | 595 |

Exemplary User Interface for the Event Chronology Tool

In an exemplary event chronology tool workbook, options are accessed from the toolbar by clicking on the event chronology tool item (e.g., on the right side of the bar). This provides a drop down box of items for which extraction, conditioning, and presentation may be accomplished. Current options include creating individual event chronologies of delay, waste, and raw material events, or any combination of the three (e.g., a delay and material merged dataset, a material and waste merged dataset, or a delay and waste merged dataset). Machine speed change events may also be incorporated into the chronology.

Figure 2:
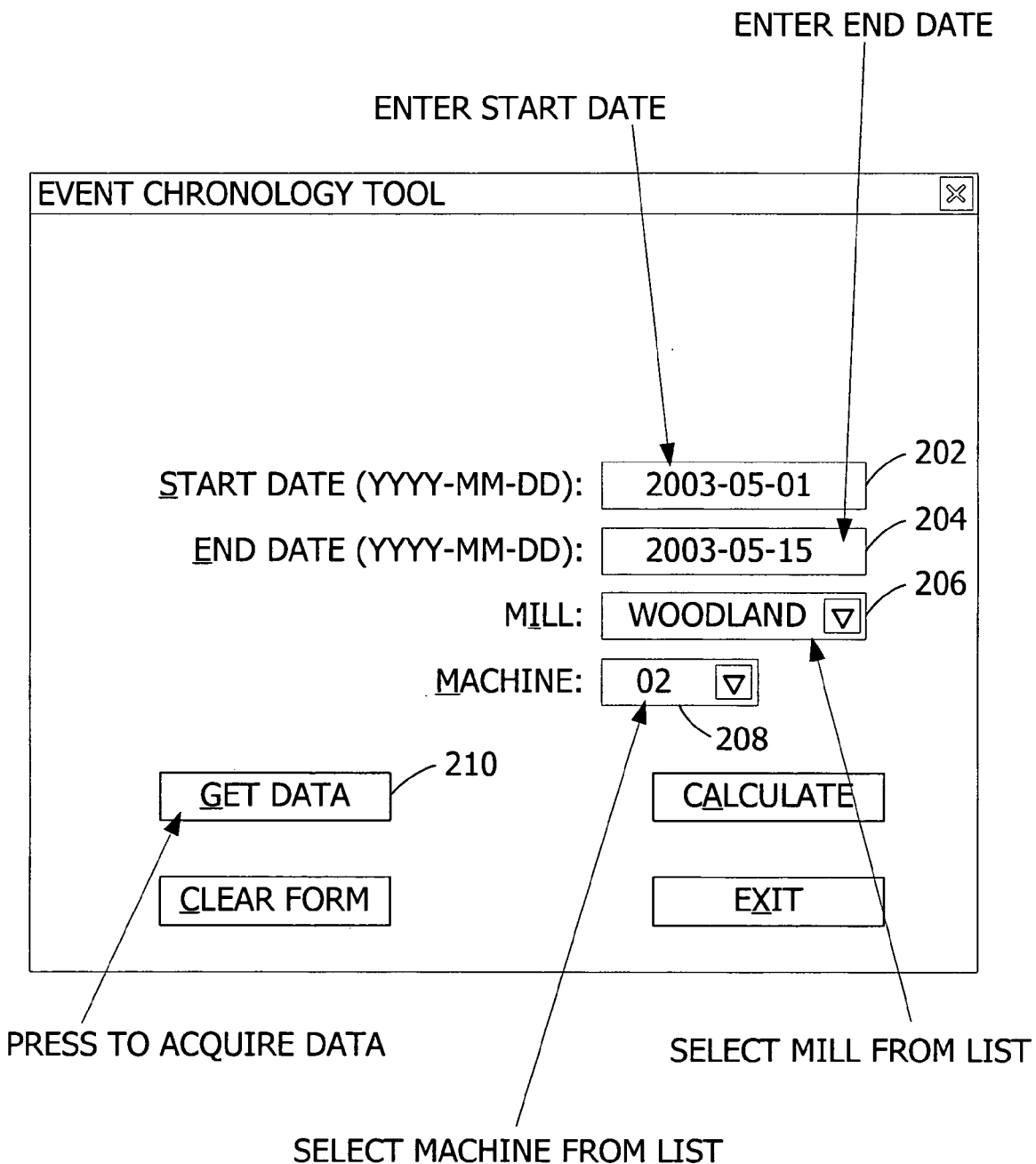
FIG. 2 is an exemplary diagram illustrating an input panel for the event chronology tool (ECT) for time and location specification.

Referring next to FIG. 2, an exemplary diagram illustrates an input panel for the event chronology tool for time and location specification. In one embodiment, the invention is operable in a computer system having a user interface including a display and a user interface selection device. Once an analysis option has been selected (e.g., via the user interface), the tool provides this input panel (e.g., a popup window) to allow specification of a time (e.g., a start date and an end date) via time interval forms 202, 204 and a target location (e.g., plant, mill 206, or machine 208) via target location forms 206, 208 for which the data extraction is requested. Similar input panels are used for other tools of the invention. Software of the invention receives a time interval value and target location value from the user via, for example, a user interface selection device such as a mouse. In one embodiment, the target location value includes, but is not limited to, one or more of the following: a mill identifier, a machine section identifier, and a machine identifier. After inputs are defined and a Get Data button 210 is triggered to run the extraction or the invention software receives some other extraction command, the tool presents the dataset as a formatted spreadsheet worksheet. The tool output depends upon which extraction option is selected. In one embodiment, any requested data extraction accessing the waste table restricts the data query to a range of five days or less. Restrictions are imposed due to possible memory constraints, maximum row capability of a spreadsheet, etc.

Table 6 below shows results of a delay and material extraction. The left portion of the worksheet displays delay records (e.g., delay time, delay problem, delay subsection, machine section), the center of the worksheet displays the event chronology data used for merging the tables (e.g., event timestamp, cut count, calculated event duration), and the right portion of the worksheet displays a portion of the material consumption data table pertaining to the specifics of the material source and process location executing the splice event. Not all fields from the tables are included in the extracted information. Modification of the data query used to create the report enables the display of different data fields in various embodiments.

TABLE 6

Results of an Exemplary Delay and Material Extraction.

Machine N-02
Start Date 1/2/2003 7:00
End Date 1/12/2003 7:00

| Delay Seconds | Delay Problem | Sub-Section | Machine Section | Run Duration | Date | Cut Count | Event Duration | Cons_Loc | Qty | Item Number | Lot Number | Cuts |
|---|---|---|---|---|---|---|---|---|---|---|---|---|
| | | | | | 1/2/2003 14:05 | 2021451 | | ConsAdhB | | | | 18837 |
| 48 | Wrench In Position At Surge Applicator | knife/anvil | surge | | 1/2/2003 14:12 | 2026311 | 4860 | | | | | |
| | | | | | 1/2/2003 14:15 | 2027708 | 1397 | LoopB | | | | 30429 |
| 106 | C-Flap Web Break At | elastic applicator | containment flap | 6395 | 1/2/2003 14:23 | 2032706 | 4998 | | | | | |

TABLE 6-continued

Results of an Exemplary Delay and Material Extraction.

Machine N-02
Start Date 1/2/2003 7:00
End Date 1/12/2003 7:00

| Delay Seconds | Delay Problem | Sub-Section | Machine Section | Run Duration | Date | Cut Count | Event Duration | Cons_Loc | Qty | Item Number | Lot Number | Cuts |
|---|---|---|---|---|---|---|---|---|---|---|---|---|
| | Elastic Unwind | roll | | | 1/2/2003 14:23 | 2032706 | 0 | TCFA | 9807 | 802750 | 7333012 | 18138 |
| 402 | weaving/ web alignment | unwind | containment flap | 272 | 1/2/2003 14:25 | 2032978 | 272 | | | | | |
| 326 | weaving/ web alignment | conveying to waist elastic | Diaper sausage | 6406 | 1/2/2003 14:41 | 2039384 | 6406 | | | | | |

Table 7 below shows results of a delay and waste extraction. The method and resulting table are similar for a material and waste extraction.

TABLE 7

Results of an Exemplary Delay and Waste Extraction.

Machine N-02
Start Date 11/1/2003 7:00
End Date 11/3/2003 7:00

| Delay Second | Delay Problem | Sub-Section | Machine Section | Run Duration | Date | Cut Count | Event Duration | Mach State | Defect Occurrence | Waste Code |
|---|---|---|---|---|---|---|---|---|---|---|
| | | | | | 11/2/2003 14:00 | 372817 | | 3 | 30 | 25 |
| | | | | | 11/1/2003 14:01 | 372847 | 30 | 5 | 71 | 25 |
| 47 | Diaper Acumeter Not Ready | melter (fws/ ptl/ surge) | adhesives | | 11/1/2003 14:01 | 373019 | 172 | | | |
| | | | | | 11/1/2003 14:01 | 373000 | 373000 | 1 | 19 | 25 |
| 2151 | Containment Flap Web Break at Drive Roll - Dr Side | flap folder | containment flap | 3621 | 11/1/2003 14:09 | 376640 | 988 | | | |
| | | | | | 11/1/2003 14:09 | 376550 | 376550 | 6 | 68 | 106 |
| | | | | | 11/1/2003 14:10 | 376618 | 68 | 1 | 4 | 106 |

Reliability Analysis Tool

A reliability analysis system (RAS) tool using event chronology data suggests locations and specific periods of operation where detailed technical diagnostics should be conducted to measure and understand the behavior of limiting factors. In one embodiment, the RAS tool receives the event chronology from the event chronology tool of the invention or from another source. Furthermore, RAS provides a comprehensive overview of asset reliability. The RAS report is different than the perspectives provided by other tools in that all periods of converting and unit operations are summarized and simultaneously judged. Other available analysis tools focus on specific periods of operation and discount all other functions and unit operations in the process.

RAS enables a user to determine where and when (e.g., with respect to other events) an operation fails. In this manner, RAS provides detailed information in support of efforts to improve specific unit operations so as to not stop the converting system once it is running, and also provides detailed information in support of efforts to improve specific unit operations to permit the process to re-start consistently once the system has stopped.

Measuring the reliability of each unit operation during machine start is one key dimension of understanding reliability improvement opportunities. Similarly, measuring the reliability of the converting system during splice event-transients helps sustain the running operation. This evaluation also includes identification of splice-induced failures in subsequent machine sections. These reliability interdependencies are included in the RAS report and permit identification of reliability issues that go undiscovered when viewed from the perspective of other enterprise information systems.

The RAS tool provides a fast, convenient, standardized means for obtaining detailed process reliability information for a particular asset and period of operation. In one embodiment, RAS and ECT operate off a macro- or query-based front end. In one embodiment, RAS functions are obtained by clicking on various toolbar options. Many items are provided as built-in menu options.

Referring again to FIG. 2, the exemplary diagram illustrating an input panel for time and location (e.g., target machine) specification for data extraction and reporting for the event chronology tool is applicable to one embodiment of the invention. Once the information is complete that specifies the analysis, the program is run by clicking on the "Get Data" button. This begins the data query, cleansing and reporting process that is built into RAS. As this runs, the conditioned, merged data set is populated onto the data page, and the results of the analysis populate the fields on the report page of the workbook. In another embodiment, the invention receives an event chronology and populates the report with this data directly (e.g., no need for extracting data from the data tables).

Software of the invention processes the event chronology to identify causal relationships between events in the event chronology. During any given time frame, there may be many different events that occur on the machine, such as diaper culls (for any number of different reasons), raw material splices, machine speed changes, machine section stops, etc. A particular event may potentially cause an adverse event in certain machine sections (including the one in which it originated) but not in others. For example, a diaper containment flap raw material splice may cause a containment flap elastic break. That same raw material splice, though, will not be able to cause a stop in the fluff forming section, because the flap raw material process is downstream from the fluff forming section, and hence not in its process flow. If only events that occur within a certain event window are tested without regard to process flow, false positives may result for events that occurred because of coincidence only.

To avoid reporting correlated events that cannot in any way be causal, the invention incorporates knowledge of the process flow into the reliability analysis. This is performed by linking each machine section with a list of other sections it may conceivably affect. For example, events that occur in Section B may cause adverse events in Sections B, C, D, F, G, and H, but not Sections A and E. In another example, events that occur in Section C may cause adverse events in Sections C, D, E, and H. The reliability analysis software consults lists such as these explicitly. The above exemplary lists of related machine sections represent process flow information that may be stored in a lookup table, a database, a flat file, or other memory area. Each event in the event chronology has a machine section associated therewith. When the event chronology is analyzed by the invention, events are compared to adverse events that occur within the event window (e.g., 1500 cuts) and that are in the process flow (e.g., by comparing the machine sections associated with the event records being compared). If both of these conditions are satisfied, then a counter is incremented in the appropriate location in the reliability analysis summary report.

Figure 3:
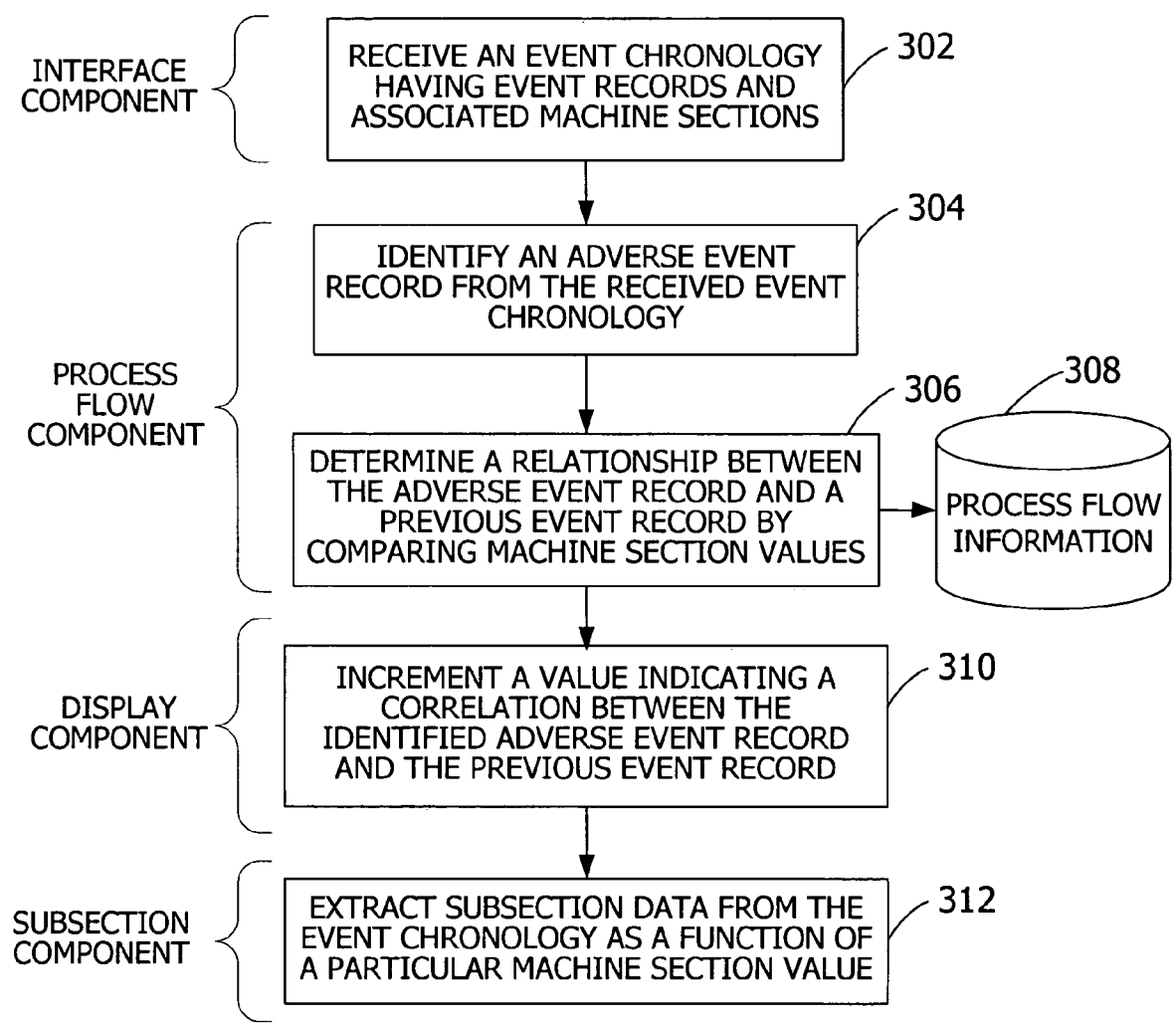
FIG. 3 is a block diagram illustrating the RAS input panel for requesting a subsection report.

Referring next to FIG. 3, a flow chart illustrates identification of causal relationships between event records in an event chronology. In the embodiment of FIG. 3, a method of the invention (e.g., embodied in software as one or more computer-readable media) receives an event chronology having a plurality of chronologically ordered event records at 302. Each of the plurality of chronologically ordered event records has either a machine section value or other equivalent value such as a material consumption value, a waste code value, or other relevant identifying value associated therewith. The method further includes identifying an adverse event record from the received event chronology at 304 and determining a relationship between the adverse event record and a previous event record in the event chronology at 306 by consulting process flow information 308. For example, consulting the process flow information comprises comparing the machine section value of the identified adverse event record to either the machine section value or material consumption location value of the previous event record. The method increments a value indicating a correlation between the identified adverse event record and the previous event record as a function of the determined relationship at 310. The method further extracts subsection data from the event chronology as a function of a particular machine section value at 312. A previous record includes one or more records which precede another record. A previous record may be the record immediately before another record and/or a record which precedes another record with several other records in between them.

In one embodiment, the method illustrated in FIG. 3 is embodied on one or more computer-readable media having computer-executable components such as an interface component, a process flow component, a display component, and a subsection component for performing the method steps 302, 304, 306, 310, and 312, respectively.

Once the query and reporting procedures are complete, further detailed reliability analysis may be conducted by executing a subsection drill-down report. This analysis is specific to a given machine section or subset of sections, and, in one embodiment, provides a material converting report which represents a cross-tabulation of stops events by subsection for given periods of operation (e.g., start-up, splice, etc.). This feature identifies the specific locations (e.g., delay subsections or material identifiers) within the unit operation that account for the stop events in that machine section or subset of sections. For example, the subsection report is used to determine the percentage of stops that occur at the unwind subsection within the splice event window for a given machine section.

Figure 4:
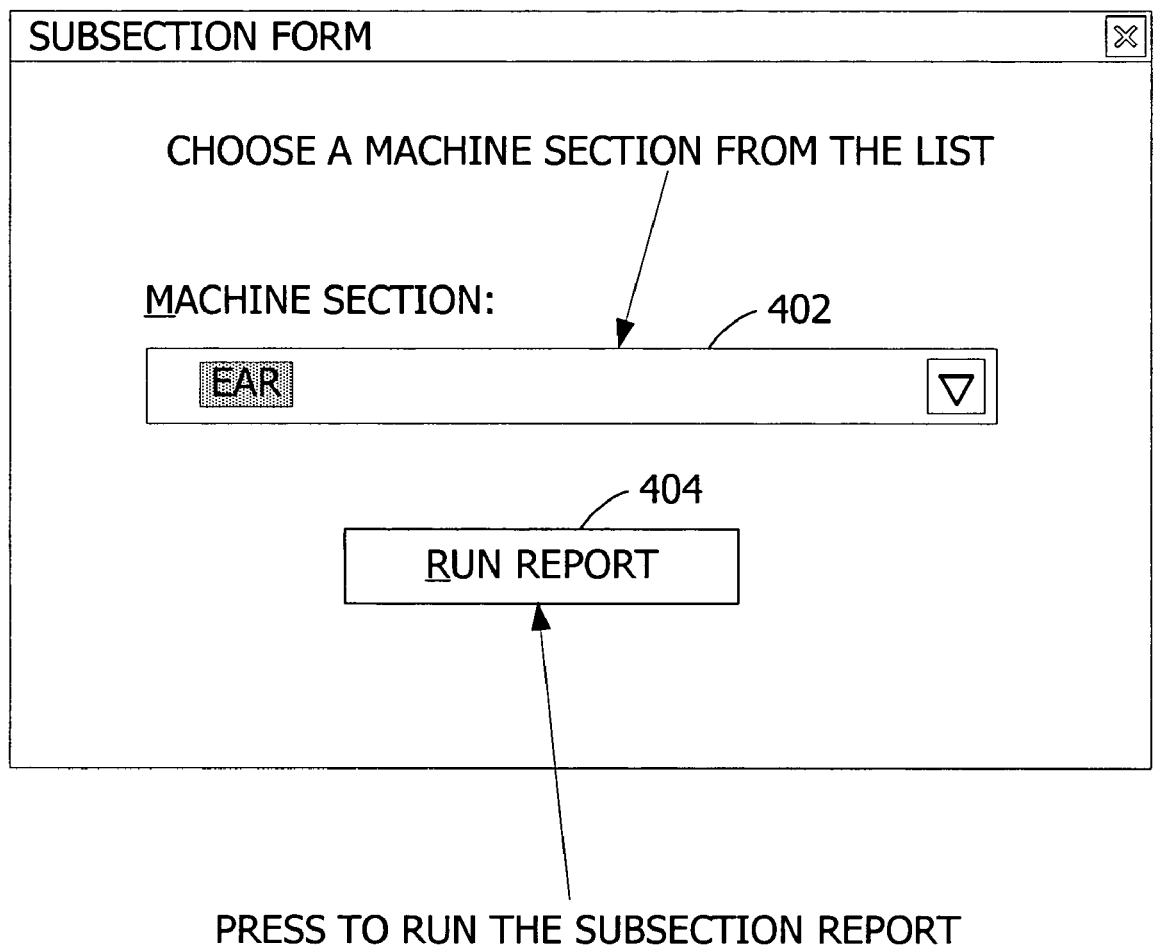
FIG. 4 is a flow chart illustrating an exemplary analysis of the event chronology.

Referring next to FIG. 4, a block diagram illustrates the RAS input panel for requesting a subsection report. In one embodiment, the setup screen for the RAS subsection report is accessed by clicking the reliability analysis system feature on the top toolbar (e.g., as is done to run the initial report) or executing some other drill-down command. A machine section or other machine section value is selected from the list provided at 402, and a Run Report button 404 is activated to execute the subprogram. In one embodiment, executing the subprogram includes extracting, in response to the received drill-down command, subsection data from the data tables as a function of the machine section value, filtering the extracted subsection data, and populating a spreadsheet with the filtered, extracted subsection data.

Table 8A and Table 8B below show the results of a subsection report conducted for the ear machine section. This is a cross-tabulation analysis that details the counts and percentages of stop events by their specific subsection and period of operation for the occurrences that were charged to the specified machine section. The data in Table 8B is merely exemplary. Results may be reported in any number of ways including by raw occurrence numbers or normalized by shift, day, uptime, etc.

TABLE 8A

Results of a Subsection Report.
Subsection Report

| Top 6 Subsections | Total Stops for Subsection | | Stops Due to Startup | | Stops Due to ear Splice | | Stops During Steady State | |
|---|---|---|---|---|---|---|---|---|
| applicator | 120 | %40 | 62 | %21 | 10 | %3 | 48 | %16 |
| cut & place | 107 | %35 | 52 | %17 | 14 | %5 | 41 | %14 |
| die cutter | 36 | %12 | 24 | %8 | 3 | %1 | 9 | %3 |
| splicer | 12 | %4 | 6 | %2 | 2 | %1 | 4 | %1 |
| unwind | 12 | %4 | 7 | %2 | 5 | %2 | 0 | %0 |
| turnbar | 6 | %2 | 6 | %2 | 0 | %0 | 0 | %0 |
| other | 9 | %3 | 7 | %2 | 2 | %1 | 0 | %0 |
| Total | 302 | %100 | 164 | %54 | 36 | %12 | 102 | %34 |

TABLE 8B

Results of a SATO Subsection Report.
SATO Subsection Report

| Top 6 Subsections | Total Stops for Subsection | | Stops Due to Startup | | Stops Due to ear Splice | | Stops During Steady State | |
|---|---|---|---|---|---|---|---|---|
| applicator | 22.52 | 38% | 5.5 | 9% | 10.5 | 18% | 6.52 | 11% |
| cut & place | 9.28 | 16% | 4.4 | 7% | 2.58 | 4% | 2.3 | 4% |
| die cutter | 9.1 | 15% | 4.3 | 7% | 2.51 | 4% | 2.29 | 4% |
| Splicer | 8.16 | 14% | 4.1 | 7% | 2.4 | 4% | 1.66 | 3% |
| Unwind | 6.36 | 11% | 3.3 | 6% | 2.39 | 4% | 0.67 | 1% |
| Turnbar | 3.2 | 5% | 2.8 | 5% | 0 | 0% | 0.4 | 1% |
| Other | 1.15 | 2% | 0.93 | 2% | 0 | 0% | 0.22 | 0% |
| Total | 59.77 | 100% | 21.9 | 42% | 4.81 | 34% | 13.62 | 24% |

Alternatively or in addition to the subsection capability, any data mining algorithms known in the art may be applied to the event chronology to determine relationships between events. The determined relationships provide a measure or analysis of the reliability of the one or more machines associated with the event chronology.

RAS also provides the complete dataset (e.g., the event chronology) as a second worksheet in the spreadsheet. This is the raw data from which the report and any subsequent drill-down analyses are constructed. The data includes the full process event chronology based on the delay and material usage tables. Common variables used to merge the tables include gs_event_dt (shift synchronizer in both tables), delay_event_dt and its analog splice_on_dt (timestamp synchronizers), and the cut synchronizers current_cut_count and cuts_on. Response variables from the delay table include delay_time, machine_section, delay_subsection, and delay_problem. Only one response variable is taken from the material usage table, as cons_loc_code may be utilized to provide definition of unwind and spindle for any of the spliced materials. The computed values of Run Duration (delay events) and Event Duration (process chronology) are included as columns in the merged dataset.

The merged data are useful for further in-depth analysis. This may be conducted in the spreadsheet environment within the RAS workbook, or exported to other analytical environments for further analysis. Statistical packages including JMP, StatGraphics, MiniTab, and the like effortlessly import the merged data sheet for further graphical, empirical, or inferential analysis.

Exemplary User Interface for the RAS Report

The RAS report shows the results of the query performed and summarizes several aspects of converting process reliability for a given asset and time frame. This comprehensive overview contains many elements, and, depending upon the use of the report, each may be important to understanding reliability. In one embodiment, the machine, time range, total days, and uptime are listed in the top left hand corner. An explanation for each column of an exemplary RAS report is shown in Table 9.

TABLE 9

Column Explanation for an Exemplary RAS Report.

| Overall Section Heading | Column Heading | Description |
|---|---|---|
| Overall - Machine section | Qualified Stops | Number of machine stops attributed to particular machine section |
| Reliability | Stops (%) | Percent of the number of stops for that section per total number of stops recorded during the specified time frame. |
| | SATO | Stops per Actual Time Operated - Number of stops per unit of uptime |
| Direct SU (Start-up) Reliability Summary | N SU Occ. | Number of startup failure occurrences for a particular machine section |
| | SU Occ. (%) | Percent of the number of start-up failures for that section per total number of start-up failures recorded during the specified time frame. |
| | Stops (%) | Percent of the number of start-up failures occurrences per total days |
| | Repeat Failures (%) | Percent of the number of SU occurrences are the same as the previous SU occurrences per total number of SU occurrences |
| Interdependent - Splice Reliability Summary | N Splices | Number of material consumption events ("splice") during the specified time frame. |
| | N Stops | Number of stops during the specified time frame |
| | Efficiency (%) | Percent of the number of qualified splice event failures per the number of material consumption events |
| | Stops (%) | Percent of the number of stops per the total number of events |
| Count of Splice Interaction Stops by Machine Section | List of all the sections that splice materials | This section helps define the impacts of material splicing on process reliability. Splice interactions are defined to measure the specific associations between the material splicing transients and delay occurrences. Only a subset of all possible combinations is defined to restrict consideration to those cases where a reasonable probability of cause-and-effect may exist. |

Figure 5:
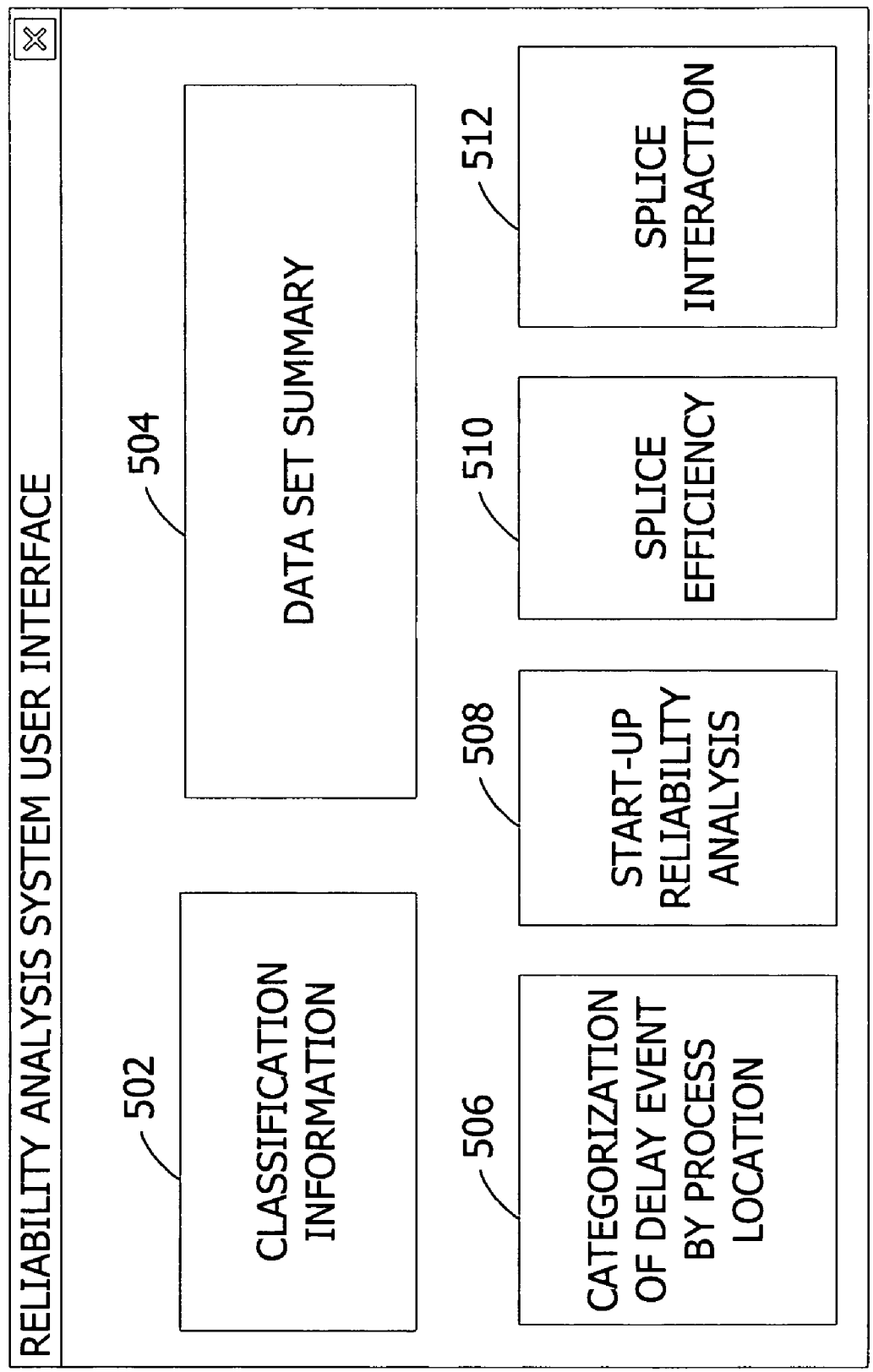
FIG. 5 is a block diagram illustrating an exemplary embodiment of a user interface for the RAS report.

Referring next to FIG. 5, a block diagram illustrates an exemplary embodiment of a user interface for the RAS report. The top, left section of the exemplary RAS report includes general classification information 502 (e.g., a first field) such as machine identification, date range used in the analysis, and results of the overall uptime computation. The top, right section of the exemplary RAS report provides a data set summary 504 (e.g., a second field) representing a summary of the data set used in the analysis. Total process events (records) are decomposed into delay and material consumption categories. An overall converting event reliability ratio (CER Ratio) is provided that measures converting reliability as the number of consumption events divided by the number of delay events. This is a good indication of overall process health and system efficiency.

The RAS report also provides a categorization of delay events by process location at 506 (e.g., a third field). Common measures of delay performance are provided such as a quantity of stop events, a percentage of stops and SATO (stops per actual time operated on a twenty-four hour basis). This portion of RAS defines the location of delay occurrences for the asset and period of record, but does not identify their relation to production sequences that may contain the root cause of the problem.

The report section (e.g., a fourth field) shown in FIG. 5 provides a tabulation of start-up failure events at 508, a percentage of total stops as start up failure, and start up stops per day, as defined by a 1500 cut event window for run duration. Any delay event occurring within 1500 cuts from a machine start is identified and tabulated to the machine section charged with causing the stop. Additionally, a count of repeat failures is included to provide a measure of difficulty during process re-start. In one embodiment, the formula for repeat failures only considers adjacent rows in the merged dataset. To be counted as a repeat failure event, consecutive rows in the spreadsheet match machine section as the cause of the delay events, and the computed run duration between these records is less than or equal to 1500 cuts. Each repeat is counted for that machine section and the total count of repeats is divided by the total count of stops for that section. This result is shown in the report as the percent of repeat failures during startup.

In another embodiment, changing the order of processing the data set (e.g., changing the computer program that conducts the analysis) enables the complete and accurate determination of repeat failures by processing the delay occurrences and material consumption records for each unit operation separately (e.g., as their own system) prior to combining such records for construction of the comprehensive machine chronology.

A splice efficiency section 510 (e.g., a fifth field) of the RAS report provides a table by machine section of the number of splices (e.g., material consumption events), number of process failures, and the computed efficiency ratio of the two. The splice efficiency section of the RAS report includes summary of splicing efficiency when including direct charges and interactions within the event window (cuts).

In one embodiment RAS considers splice efficiency across a 1500 cut process event window, and includes failures in machine sections other than the ones containing the splicing device (e.g., executing the material consumption event). This is a broad-based evaluation where reliability is computed in view of interdependence. The splice transient is assigned responsibility for generating a stop occurrence if the delay occurs within a specified subset of downstream, different machine sections. For example, during the manufacturing of diapers, it is not uncommon to attach elastics onto a nonwoven web before attaching onto the diaper. During the transients that occur when a new roll of nonwoven material is spliced onto the machine, there is an increased probability of an elastic strand break. While the overall failure rate of elastic strands is useful, this section of RAS quantifies the failure rate of elastic strands to the nonwoven material splice event (or any other event that is deemed relevant). This both identifies an area of opportunity, as well as allows a researcher to calculate, for example, the positive impact on productivity if larger rolls of the nonwoven material were to be used, resulting in less splices.

A machine section or splice interaction 512 matrix used to compute splice efficiencies is interpreted vertically (e.g., columnar format). Each column provides the count of failures experienced in a machine section (e.g., stop events by splice type). Direct material consumption-machine section relations or the interdependent relations (material consumption-downstream machine section failure) are identified in the splice interaction section 512 (e.g., by shading those cells).

Tables A1–A4 in Appendix A illustrate an exemplary RAS report. The RAS report may be provided as one or more separate tables as shown in Appendix A. Alternatively, the RAS report may be provided as a single report combining one or more of Tables A1–A4. Further, the RAS report according to the invention may include various visual styles to enhance the readability of the report and convey various statistics. For example, bold text may indicate machine sections that execute running slices, italic text may indicate machine sections that require a stop to replenish expired materials, and shaded machine sections may indicate machine sections that have greater than five percent of the total qualified stops. Further, lightly shaded splice reliability data may indicate stops in machine sections containing materials spliced while running. Lightly shaded splice interaction stops data may indicate a count of probable interactions between a material splice and a delay charged to a machine section. Dark shaded splice interaction stops may indicate direct linkage between material splicing and a delay in a machine section (e.g., liner splice to liner unwind).

Remarks

It is to be understood that the order of execution or performance of the methods and techniques illustrated and described herein is exemplary and not essential, unless otherwise specified. That is, elements of the methods may be executed or performed in any order, unless otherwise specified, and that the methods may include more or less elements than those disclosed herein. For example, it is contemplated that executing or performing a particular element before, contemporaneously with, or after another element is within the scope of the invention.

In one embodiment of the invention, any computing device such as those known in the art is suitable for use with the invention. A user may enter commands and information into the computing device through input devices or user interface selection devices well known in the art such as a keyboard and a pointing device (e.g., a mouse, trackball, pen, or touch pad).

The computing device typically has at least some form of computer readable media. Computer readable media, which include both volatile and nonvolatile media, removable and non-removable media, may be any available medium that may be accessed by the computing device. Generally, computer readable media include memory areas for storing data. By way of example and not limitation, computer readable media comprise computer storage media and communication media. Computer storage media include volatile and nonvolatile, removable and non-removable media implemented in any method or technology for storage of information such as computer readable instructions, data structures, program modules or other data, as is well known in the art. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media. The invention also includes the computing device itself when programmed according to the methods and techniques described herein.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. For purposes of illustration, programs and other executable program components, such as the operating system, are illustrated herein as discrete blocks. It is recognized, however, that such programs and components reside at various times in different storage components of the computer, and are executed by the data processor(s) of the computer. The invention may also be practiced in distributed computing environments where tasks are performed by remote processing devices that are linked through a communications network. In a distributed computing environment, program modules may be located in both local and remote computer storage media including memory storage devices.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions, products, and methods without departing from the scope of the invention, it is intended that all matter contained in the above description and shown in the accompanying drawings shall be interpreted as illustrative and not in a limiting sense.

APPENDIX A

TABLE A1

Overall Machine Section Reliability Report.

Reliability Analysis System - Event Based Scorecard

| Machine: | ZD-11 | | Total Days: | 31 |
| From: | gs_event_dt | 5/1/2003 6:00 | Uptime (Days): | 27.54 |
| To: | gs_event_dt | 5/31/2003 6:00 | | |

| PIPE/STORM Summary | N | Events (%) | Event Specifications |
| --- | --- | --- | --- |
| Total Process Events | 4,886 | 100 | |
| Material Usage Events | 3,548 | | |
| Running Usage Events | 3,384 | 69.3 | Splices & Interactions(Window = 1500 cuts) |
| Qualified Stop Occurrences | 1,332 | 27.3 | SU Failures (Window = 1500 cuts) |

Overall Machine Section Reliability

| Machine Section | Qualified Stops | State 2 Stops | Stops (%) | SATO | Minutes |
| --- | --- | --- | --- | --- | --- |
| Ear | 321 | 0 | 24.0 | 11.7 | 756 |
| Leg Elastic | 119 | 0 | 8.9 | 4.3 | 364 |
| Landing Zone | 110 | 0 | 8.2 | 4.0 | 313 |
| Containment Flap | 92 | 0 | 6.9 | 3.3 | 330 |
| Waist Elastic | 85 | 0 | 6.4 | 3.1 | 226 |
| TCF Elastic | 78 | 0 | 5.8 | 2.8 | 215 |
| Bladefolder | 76 | 0 | 5.7 | 2.8 | 195 |
| Diaper Sausage | 65 | 0 | 4.9 | 2.4 | 317 |
| Outer Cover | 63 | 0 | 4.7 | 2.3 | 322 |
| Surge | 38 | 0 | 2.8 | 1.4 | 57 |
| Electrical | 36 | 0 | 2.7 | 1.3 | 219 |
| Adhesives | 35 | 0 | 2.6 | 1.3 | 511 |
| Carrier Sheet | 35 | 0 | 2.6 | 1.3 | 102 |
| Skin Care | 35 | 0 | 2.6 | 1.3 | 137 |
| Stacker | 30 | 0 | 2.2 | 1.1 | 109 |
| Fluff Sausage | 24 | 0 | 1.8 | 0.9 | 84 |
| Liner | 24 | 0 | 1.8 | 0.9 | 65 |
| Bagger | 19 | 0 | 1.4 | 0.7 | 46 |
| General Plant | 10 | 0 | 0.7 | 0.4 | 127 |
| Spacer Layer | 7 | 0 | 0.5 | 0.3 | 15 |
| Water Cutter System | 7 | 0 | 0.5 | 0.3 | 43 |
| Fluff Forming | 6 | 0 | 0.4 | 0.2 | 5 |
| Inner Cover | 6 | 0 | 0.4 | 0.2 | 21 |

TABLE A1-continued

Overall Machine Section Reliability Report.

| | | | | | |
|---|---|---|---|---|---|
| Pulp | 5 | 0 | 0.4 | 0.2 | 5 |
| Casepacker | 3 | 0 | 0.2 | 0.1 | 21 |
| Stack Handling | 3 | 0 | 0.2 | 0.1 | 11 |
| Operator Stop | 2 | 0 | 0.1 | 0.1 | 5 |
| SAM | 2 | 0 | 0.1 | 0.1 | 2 |
| Barrier Tissue | 1 | 0 | 0.1 | 0.0 | 3 |
| Mechanical | 1 | 0 | 0.1 | 0.0 | 1 |
| Dust System | 0 | 0 | 0.0 | 0.0 | 0 |
| Ear Prefastener | 0 | 0 | 0.0 | 0.0 | 0 |
| Package Handling | 0 | 0 | 0.0 | 0.0 | 0 |
| Quality | 0 | 0 | 0.0 | 0.0 | 0 |
| Side Panel Bonder | 0 | 0 | 0.0 | 0.0 | 0 |
| Side Panel Folder | 0 | 0 | 0.0 | 0.0 | 0 |
| Total | 1338 | 0 | 100.0 | 48.6 | 4626 |

TABLE A2

Direct Start Up Reliability Summary Report.

Reliability Analysis System —Event Based Scorecard

| Machine: | ZD-11 | | Total Days: | 31 |
|---|---|---|---|---|
| From: | gs_event_dt | 5/1/2003 6:00 | Uptime (Days): | 27.54 |
| To: | gs_event_dt | 5/31/2003 6:00 | | |

| PIPE/STORM Summary | N | Events (%) | Event Specifications |
|---|---|---|---|
| Total Process Events | 4,886 | 100 | |
| Material Usage Events | 3,548 | | |
| Running Usage Events | 3,384 | 69.3 | Splices & Interactions(Window = 1500 cuts) |
| Qualified Stop Occurrences | 1,332 | 27.3 | SU Failures (Window = 1500 cuts) |

Direct SU Reliability Summary

| Machine Section | N SU Occ. | SU Occ (%) | Stops(%) | Repeat Failures (%) |
|---|---|---|---|---|
| Ear | 177 | 55.1 | 5.7 | 23.1 |
| Leg Elastic | 79 | 66.4 | 2.5 | 18.5 |
| Landing Zone | 46 | 41.8 | 1.5 | 15.5 |
| Containment Flap | 37 | 40.2 | 1.2 | 6.5 |
| Waist Elastic | 32 | 37.6 | 1.0 | 12.9 |
| TCF Elastic | 26 | 33.3 | 0.8 | 5.1 |
| Bladefolder | 36 | 47.4 | 1.2 | 14.5 |
| Diaper Sausage | 42 | 64.6 | 1.4 | 10.8 |
| Outer Cover | 12 | 19.0 | 0.4 | 1.6 |
| Surge | 16 | 42.1 | 0.5 | 10.5 |
| Electrical | 11 | 30.6 | 0.4 | 16.7 |
| Adhesives | 18 | 51.4 | 0.6 | 25.7 |
| Carrier Sheet | 13 | 37.1 | 0.4 | 5.7 |
| Skin Care | 21 | 60.0 | 0.7 | 34.3 |
| Stacker | 17 | 56.7 | 0.5 | 10.0 |
| Fluff Sausage | 15 | 62.5 | 0.5 | 8.3 |
| Liner | 10 | 41.7 | 0.3 | 12.5 |
| Bagger | 1 | 5.3 | 0.0 | 0.0 |
| General Plant | 3 | 30.0 | 0.1 | 10.0 |
| Spacer Layer | 2 | 28.6 | 0.1 | 14.3 |
| Water Cutter System | 2 | 28.6 | 0.1 | 0.0 |
| Fluff Forming | 6 | 100.0 | 0.2 | 66.7 |
| Inner Cover | 2 | 33.3 | 0.1 | 0.0 |
| Pulp | 0 | 0.0 | 0.0 | 0.0 |
| Casepacker | 1 | 33.3 | 0.0 | 33.3 |
| Stack Handling | 0 | 0.0 | 0.0 | 0.0 |
| Operator Stop | 2 | 100.0 | 0.1 | 0.0 |
| SAM | 0 | 0.0 | 0.0 | 0.0 |
| Barrier Tissue | 0 | 0.0 | 0.0 | 0.0 |
| Mechanical | 0 | 0.0 | 0.0 | 0.0 |
| Dust System | 0 | 0.0 | 0.0 | 0.0 |
| Ear Prefastener | 0 | 0.0 | 0.0 | 0.0 |
| Package Handling | 0 | 0.0 | 0.0 | 0.0 |

TABLE A2-continued

Direct Start Up Reliability Summary Report.

| | | | | |
|---|---|---|---|---|
| Quality | 0 | 0.0 | 0.0 | 0.0 |
| Side Panel Bonder | 0 | 0.0 | 0.0 | 0.0 |
| Side Panel Folder | 0 | 0.0 | 0.0 | 0.0 |
| Total | 627 | 46.9 | 20.2 | 15.0 |

TABLE A3

Interdependent Splice Reliability Summary Report.

Reliability Analysis System —Event Based Scorecard

| Machine: | ZD-11 | | Total Days: | 31 |
|---|---|---|---|---|
| From: | gs_event_dt | 5/1/2003 6:00 | Uptime (Days): | 27.54 |
| To: | gs_event_dt | 5/31/2003 6:00 | | |

| PIPE/STORM Summary | N | Events (%) | Event Specifications |
|---|---|---|---|
| Total Process Events | 4,886 | 100 | |
| Material Usage Events | 3,548 | | |
| Running Usage Events | 3,384 | 69.3 | Splices & Interactions (Window = 1500 cuts) |
| Qualified Stop Occurrences | 1,332 | 27.3 | SU Failures (Window = 1500 cuts) |

| | Interdependent Splice Reliability Summary | | | |
|---|---|---|---|---|
| Machine Section | N Splices | N Stops | Effic(%) | Stops (%) |
| Ear | 594 | 47 | 92.1 | 3.5 |
| Leg Elastic | | | | |
| Landing Zone | 342 | 13 | 96.2 | 1.0 |
| Containment Flap | 437 | 53 | 87.9 | 4.0 |
| Waist Elastic | 100 | 7 | 93.0 | 0.0 |
| TCF Elastic | | | | |
| Bladefolder | | | | |
| Diaper Sausage | | | | |
| Outer Cover | 279 | 53 | 81.0 | 4.0 |
| Surge | 132 | 9 | 93.2 | 0.7 |
| Electrical | | | | |
| Adhesives | | | | |
| Carrier Sheet | | | | |
| Skin Care | | | | |
| Stacker | | | | |
| Fluff Sausage | | | | |
| Liner | 275 | 20 | 92.7 | 1.5 |
| Bagger | | | | |
| General Plant | | | | |
| Spacer Layer | 336 | 4 | 98.8 | 0.3 |
| Water Cutter System | | | | |
| Fluff Forming | | | | |
| Inner Cover | 376 | 31 | 91.8 | 2.3 |
| Pulp | | | | |
| Casepacker | | | | |
| Stack Handling | | | | |
| Operator Stop | | | | |
| SAM | | | | |
| Barrier Tissue | 218 | 1 | 99.5 | 0.1 |
| Mechanical | | | | |
| Dust System | | | | |
| Ear Prefastener | | | | |
| Package Handling | | | | |
| Quality | | | | |
| Side Panel Bonder | | | | |
| Side Panel Folder | | | | |
| Total | 3089 | 238 | 92.3 | 17.9 |

TABLE A4

Count of Splice Interaction Stops by Machine Section Report.

Reliability Analysis System - Event Based Scorecard

| Machine: | ZD-11 | | | Total Days: | 31 |
|---|---|---|---|---|---|
| From: | gs_event_dt | 5/1/2003 6:00 | | Uptime (Days): | 27:54 |
| To: | gs_event_dt | 5/31/2003 6:00 | | | |

| PIPE/STORM Summary | N | Events (%) | Event Specifications |
|---|---|---|---|
| Total Process Events | 4,886 | 100 | |
| Material Usage Events | 3,548 | | |
| Running Usage Events | 3,384 | 69.3 | Splices & Interactions (Window = 1500 cuts |
| Qualified Stop Occurrences | 1,332 | 27.3 | SU Failures (Window = 1500 cuts |

| | Count of splice Interaction Stops by Machine Section | | | | | | | | |
|---|---|---|---|---|---|---|---|---|---|
| Machine Section | BT | CF | Ear | IC | Lnr | LZ | OC | SL | Srg | WE |
| Ear | | 0 | 44 | 10 | 4 | 0 | 7 | | | |
| Leg Elastic | | | 0 | 5 | | | 1 | | | |
| Landing Zone | | | | 3 | 0 | 12 | 6 | | | |
| Containment Flap | 0 | 30 | | | | | | | | |
| Waist Elastic | | | | | | | | | 0 | 7 |
| TCF Elastic | 0 | 23 | | | | | | | | |
| Bladefolder | | | | 2 | | 0 | 4 | | | |
| Diaper Sausage | 0 | 0 | 3 | 2 | 2 | | 0 | | | 0 |
| Outer Cover | | | | 0 | 1 | | 1 | 33 | | |
| Surge | | | | | 0 | 3 | | 0 | 9 | |
| Electrical | | | | | | | | | | |
| Adhesives | | | | | | | | | | |
| Carrier Sheet | | | 0 | 5 | | 0 | 1 | | | |
| Skin Care | | | | | 0 | | | | | 0 |
| Stacker | | | | | 1 | 0 | 1 | | | 0 |
| Fluff Sausage | 0 | | | | | | | 1 | | |
| Liner | | | | 0 | 7 | | | | 0 | 0 |
| Bagger | | | | | | | | | | |
| General Plant | | | | | | | | | | |
| Spacer Layer | | | | | | | 0 | 3 | | |
| Water Cutter System | | 0 | 0 | 0 | 3 | | 0 | | | 0 |
| Fluff Forming | 0 | | | | | | | 0 | | |
| Inner Cover | | | 0 | 3 | | 0 | 0 | | | |
| Pulp | | | | | | | | | | |
| Casepacker | | | | | | | | | | |
| Stack Handling | | | | | | | | | | 0 |
| Operator Stop | 0 | 0 | 0 | 0 | 0 | 0 | 0 | 0 | 0 | 0 |
| SAM | | | | | | | | | | |
| Barrier Tissue | 1 | | | | | | | | | 0 |
| Mechanical | | | | | | | | | | |
| Dust System | | | | | | | | | | |
| Ear Prefastener | 0 | 0 | 0 | 0 | 0 | 0 | 0 | 0 | 0 | 0 |
| Package Handling | | | | | | | | | | |
| Quality | 0 | 0 | 0 | 0 | 0 | 0 | 0 | 0 | | |
| Side Panel Bonder | 0 | 0 | 0 | 0 | 0 | 0 | 0 | 0 | 0 | 0 |
| Side Panel Folder | 0 | 0 | 0 | 0 | 0 | 0 | 0 | 0 | | |
| Total | 1 | 53 | 47 | 31 | 20 | 13 | 53 | 4 | 9 | 7 |

What is claimed is:

1. A method for analyzing reliability of a manufacturing system, said method comprising:

receiving an event chronology having a plurality of chronologically ordered event records, said event chronology being associated with a manufacturing system, said manufacturing system including a plurality of machines operating in sequence, each of the plurality of machines operating in sequence being identified by a machine section value, each of the plurality of chronologically ordered event records having a machine section value associated therewith;

identifying an adverse event record in the received event chronology;

determining a relationship between the adverse event record associated with one of the plurality of machines and at least one previous event record in the event chronology, said at least one previous event record being associated with the one machine or another machine from the plurality of machines, said other machine operating previous to the one machine in the sequence, said determining including comparing the machine section value of the identified adverse event record and the machine section value of the previous event record; and incrementing a value representative of a correlation between the identified adverse event record and the previous event record as a function of the determined relationship.

2. The method of claim 1, wherein determining the relationship comprises accessing a memory area storing process flow information, said process flow information identifying relationships between machine sections.

3. The method of claim 2, further comprising storing the process flow information in the memory area.

4. The method of claim 1, wherein the event chronology is associated with a particular converting line and further comprising acting on the incremented value by modifying the particular converting line based on the determined relationship.

5. The method of claim 1, further comprising extracting machine subsection data from one or more data tables as a function of a particular machine section value.

6. The method of claim 1, further comprising exporting the event chronology and the incremented value to an analytical environment for further processing.

7. The method of claim 1, wherein the received event chronology comprises waste data, delay data, and material usage data collected from an event-based manufacturing system.

8. The method of claim 1, wherein the received event chronology comprises data related to the manufacture of an absorbent article.

9. The method of claim 1, wherein the incremented value is associated with one or more of the following: the machine section value of the identified adverse event record, and the machine section value of the previous event record.

10. The method of claim 1, wherein determining the relationship comprises determining whether the identified adverse event record and the previous event record are within a predefined event window.

11. The method of claim 1, wherein one or more computer storage media have computer-executable instructions for performing the method recited in claim 1.

12. One or more computer storage media having computer-executable components for analyzing reliability of a manufacturing process, said components comprising:
  an interface component for receiving an event chronology having a plurality of chronologically ordered event records, said event chronology being associated with a manufacturing system, said manufacturing system including a plurality of machines operating in sequence, each of the plurality of machines operating in sequence being identified by a machine section value, each of the plurality of chronologically ordered event records having a machine section value associated therewith;
  a process flow component for identifying a causal relationship between the event records in the event chronology received by the interface component by:
    identifying an adverse event record in the event chronology, said identified adverse event record being associated with one of the plurality of machines in the sequence; and
    determining if the machine section value of the identified adverse event record and the machine section value of at least one previous event record in the event chronology are related, said at least one previous event record being associated with the one machine or another machine from the plurality of machines, said other machine operating previous to the one machine in the sequence; and
  a display component for displaying the identified causal relationship to a user.

13. The computer storage media of claim 12, wherein the process flow component further increments a value representative of a correlation between the identified adverse event record and the previous event record responsive to the identified causal relationship.

14. The computer storage media of claim 13, wherein the incremented value is associated with one or more of the following: the machine section value of the identified adverse event record, and the machine section value of the previous event record.

15. The computer storage media of claim 12, further comprising a chronology component for extracting delay data and raw material usage data from one or more data tables as a function of a time interval value and a target location value and merging the extracted delay data and raw material usage data into the event chronology.

16. The computer storage media of claim 12, further comprising a subsection component for extracting subsection data from one or more data tables as a function of a particular machine section value.

17. The computer storage media of claim 12, wherein the received event chronology comprises waste data, delay data, and material usage data collected from an event-based manufacturing system.

18. The computer storage media of claim 12, wherein the received event chronology comprises data related to the manufacture of an absorbent article.

19. The computer storage media of claim 12, further comprising a subsection component for extracting, as a function of a particular machine section value, subsection data from the event chronology received by the interface component.

20. The computer storage media of claim 12, wherein the process flow component identifies the causal relationship further by determining whether the identified adverse event record and the previous event record are within a predefined event window.

21. A system for analyzing the reliability of a manufacturing process having one or more machine sections, said system comprising:
  an event chronology having a plurality of chronologically ordered event records, each of the plurality of chronologically ordered event records having a machine section value associated therewith, said event chronology being associated with a manufacturing system, said manufacturing system including a plurality of machines operating in sequence, each of the plurality of machines operating in sequence being identified by a machine section value;
  a memory area for storing process flow information identifying at least one relationship between machine section values; and
  a processor configured to execute computer-executable instructions for identifying a causal relationship between at least two of the event records in the event chronology, said at least two of the event records being associated with machines in sequence in the manufacturing system, said identifying including accessing the process flow information stored in the memory area and comparing the accessed process flow information with the machine section values corresponding to the machines associated with the at least two of the event records.

22. The system of claim 21, further comprising a user interface for displaying the identified causal relationship to a user.

23. The system of claim 21, wherein the processor is further configured to execute computer-executable instructions for identifying the causal relationship by identifying an adverse event record in the event chronology and determining if the machine section value of the identified adverse event record and the machine section value of a previous event record in the event chronology are related per the process flow information stored in the memory area.

24. The system of claim 23, wherein the processor is further configured to execute computer-executable instructions for identifying the causal relationship by determining whether the identified adverse event record and the previous event record are within a predefined event window.

25. The system of claim 21, wherein the event chronology is associated with the manufacturing system including the plurality of machines operating in sequence on a web of absorbent material to create an absorbent article.

26. The system of claim 21, further comprising:
a chronology tool for building the event chronology from data collected from an event-based manufacturing system; and
a reliability analysis tool for producing a report from the event chronology built by the chronology tool, said report including the event chronology, said report further including a plurality of dimensions, said dimensions including a measure of reliability during machine start, a measure of reliability of a running operation, and a measure of reliability per asset in the production sequence and per time frame.

27. The system of claim 26, wherein the reliability analysis tool further produces a subsection report for a machine section, said subsection report representing a cross-tabulation of a plurality of stop events to identify one or more delay subsections for the machine section, wherein the reliability analysis tool further produces a material converting report for a machine section, said material converting report representing a cross-tabulation of a plurality of stop events for the machine section to identify one or more material identifiers related to the plurality of stop events, and wherein the reliability analysis tool further produces a material converting report for a subset of machine sections, said material converting report representing a cross-tabulation of a plurality of stop events for the subset of machine sections to identify one or more material identifiers related to the plurality of stop events.

28. The system of claim 21, further comprising a user interface having a display and providing a report and a data set used to generate the report, said user interface comprising:
a start-up reliability portion for displaying on the display a tabulation of start-up failure events for a target machine during a time interval; and
an efficiency portion for displaying on the display splice efficiency data for the target machine during the time interval.

29. The system of claim 28, wherein the user interface further comprises a classification portion for displaying classification information on the display, said classification information specifying the target machine and the time interval, a summary portion for displaying on the display a data set summary for the target machine during the time interval, and a delay event portion for displaying on the display a plurality of delay events for the target machine during the time interval categorized by process location.

30. The system of claim 28, wherein the user interface further comprises:
a first field for displaying classification information on the display, said classification information specifying a target machine and a time interval;
a second field for displaying on the display a data set summary for the target machine during the time interval;
a third field for displaying on the display a plurality of delay events for the target machine during the time interval categorized by process location;
a fourth field for displaying on the display a tabulation of start-up failure events for the target machine during the time interval; and
a fifth field for displaying on the display splice efficiency data for the target machine during the time interval.

31. The system of claim 30, wherein the second field further displays one or more of the following for the target machine during the time interval: a count of process events organized into delay and material consumption categories, and a converting event reliability ratio measuring converting reliability as a count of consumption events divided by a count of delay events to indicate overall system health and efficiency, and wherein the fourth field further displays a count of repeat failures for the target machine during the time interval to provide a measure of difficulty during process re-start.

32. The system of claim 30, wherein the fifth field further displays one or more of the following for the target machine during the time interval: a splice count per machine section, a process failure count per machine section, and a computed efficiency ratio of the splice count and the process failure count, or wherein the fifth field represents splice efficiency across a 1500 cut process event window, or wherein the fifth field displays the splice efficiency data having an event window length, said event window length being from about 0 cuts to about 3000 cuts.

33. The system of claim 30, wherein the data set comprises waste, delay, and material usage data collected from an event-based manufacturing system for the target machine during the time interval, and wherein the second field displays the data set summary relating to data collected by an event-based manufacturing system, or wherein the second field displays the data set summary relating to data pertaining to the manufacture of an absorbent article.

* * * * *

UNITED STATES PATENT AND TRADEMARK OFFICE
CERTIFICATE OF CORRECTION

| | | |
|---|---|---|
| PATENT NO. | : 7,221,987 B2 | Page 1 of 1 |
| APPLICATION NO. | : 10/868137 | |
| DATED | : May 22, 2007 | |
| INVENTOR(S) | : Thomas Arthur Bett et al. | |

It is certified that error appears in the above-identified patent and that said Letters Patent is hereby corrected as shown below:

On the Title Page of the Patent:
(54) "GENERATING A RELIABILITY ANALYSIS BY IDENTIFYING CASUAL RELATIONSHIPS BETWEEN EVENTS IN AN EVENT-BASED MANUFACTURING SYSTEM" should read -- GENERATING A RELIABILITY ANALYSIS BY IDENTIFYING CAUSAL RELATIONSHIPS BETWEEN EVENTS IN AN EVENT-BASED MANUFACTURING SYSTEM --.

Signed and Sealed this

Seventh Day of April, 2009

JOHN DOLL
*Acting Director of the United States Patent and Trademark Office*

UNITED STATES PATENT AND TRADEMARK OFFICE
CERTIFICATE OF CORRECTION

| | | |
|---|---|---|
| PATENT NO. | : 7,221,987 B2 | Page 1 of 1 |
| APPLICATION NO. | : 10/868137 | |
| DATED | : May 22, 2007 | |
| INVENTOR(S) | : Thomas Arthur Bett et al. | |

It is certified that error appears in the above-identified patent and that said Letters Patent is hereby corrected as shown below:

On the Title Page of the Patent, Item (54) and Column 1, lines 1-4 "GENERATING A RELIABILITY ANALYSIS BY IDENTIFYING CASUAL RELATIONSHIPS BETWEEN EVENTS IN AN EVENT-BASED MANUFACTURING SYSTEM" should read -- GENERATING A RELIABILITY ANALYSIS BY IDENTIFYING CAUSAL RELATIONSHIPS BETWEEN EVENTS IN AN EVENT-BASED MANUFACTURING SYSTEM --.

This certificate supersedes the Certificate of Correction issued April 7, 2009.

Signed and Sealed this

Twenty-eighth Day of April, 2009

JOHN DOLL
*Acting Director of the United States Patent and Trademark Office*